(12) United States Patent
Criddle et al.

(10) Patent No.: US 6,739,135 B2
(45) Date of Patent: May 25, 2004

(54) CONTROL SYSTEM FOR AN INTERNAL COMBUSTION ENGINE BOOSTED WITH AN ELECTRONICALLY CONTROLLED PRESSURE CHARGING DEVICE

(75) Inventors: Mark A. Criddle, Chelmsford (GB); Simon Petrovich, Ditton Fields (GB); Guy R. Morgan, Chelmsford (GB); Jon Dixon, Maldon (GB)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/263,574

(22) Filed: Oct. 3, 2002

(65) Prior Publication Data

US 2003/0110770 A1 Jun. 19, 2003

(30) Foreign Application Priority Data

Oct. 3, 2001 (EP) .............................. 01308460

(51) Int. Cl.$^7$ .................................................. F02B 33/44
(52) U.S. Cl. ........................................ 60/608; 123/565
(58) Field of Search ..................... 60/607, 608; 123/565

(56) References Cited

U.S. PATENT DOCUMENTS

| | | | |
|---|---|---|---|
| 4,745,755 A | 5/1988 | Kawamura | 60/608 |
| 4,757,686 A | 7/1988 | Kawamura et al. | 60/608 |
| 4,774,811 A | 10/1988 | Kawamura | 60/608 |
| 5,426,589 A | 6/1995 | Kitagawa et al. | 700/274 |
| 5,751,137 A * | 5/1998 | Kiuchi et al. | 60/608 |
| 6,064,122 A * | 5/2000 | McConnell | 60/608 |
| 6,437,535 B1 * | 8/2002 | Sinha | 318/800 |

FOREIGN PATENT DOCUMENTS

| | | | | |
|---|---|---|---|---|
| DE | 19712850 | 10/1998 | | F02B/37/16 |
| EP | 0079100 | 5/1983 | | F02B/37/10 |
| GB | 800263 | 8/1958 | | |
| JP | 09032569 | 2/1997 | | F02B/39/10 |
| JP | 10159577 | 6/1998 | | F02B/39/10 |

* cited by examiner

Primary Examiner—Sheldon J. Richter
(74) Attorney, Agent, or Firm—Brinks Hofer Gilson & Lione

(57) ABSTRACT

The present invention relates to an electronically driven pressure boosting system that is used to boost the torque output of an internal combustion engine. The system comprises an electrically driven pressure charging device, an electrical supply system for providing electrical power to drive the pressure charging device including a battery and an engine-driven battery recharger, and an electronic control system for controlling the operation of the pressure charging device and the electrical supply system. The electronic control system determines one or more allowable operating limits to the operation of the pressure charging device based on the state of the electrical supply system, and drives the pressure charging device using the engine-driven battery recharger when the state of the electrical supply system is within an acceptable range. The engine control system then isolates at least partially the battery from the engine-driven battery recharger and drive the pressure charging device using the battery when the state of the electrical supply system is not within an acceptable range.

13 Claims, 5 Drawing Sheets

CONTROL SYSTEM FOR AN INTERNAL COMBUSTION ENGINE BOOSTED WITH AN ELECTRONICALLY CONTROLLED PRESSURE CHARGING DEVICE

BACKGROUND a. Field of the Invention

The present invention relates to an electronically driven pressure boosting system that is used to boost the torque output of an internal combustion engine.

b. Related Art

One way to boost the torque and peak power provided by a reciprocating piston internal combustion engine, is to use a pressure boosting device to increase the mass airflow into the engine. The increased air supply then permits a greater amount of fuel to be combusted in each ignition event.

Examples of pressure boosting devices include turbochargers and superchargers. A turbocharger is driven entirely or partly by energy in the exhaust stream. This is an efficient use of otherwise mostly wasted energy, but such devices suffer from the limitation that the boost is not available or significant at low engine speeds (rpms). Often, a driver may demand high torque from an engine at low rpms, for example at the start of an overtaking manoeuvre. If the pressure boost device is driven only by exhaust gasses, then boosted torque will not be available at low rpms.

One way of dealing with the limitation is to provide an electrical motor connected to the turbocharger, which is energised when the turbo boost is insufficient. This type of electrically driven pressure boosting device is, however, expensive in terms of hardware cost. Another solution is to use a supercharger, that is, a compressor device that is driven by means other than an exhaust gas turbine, for example via a mechanical linkage to the engine, or by an electrical motor driven from the vehicle battery and/or battery charging system. Mechanical supercharger systems can however, be mechanically bulky and expensive. Electrically driven supercharger systems provide a lower cost and compact solution, but can require a significant amount of electrical energy when driven, for example, up to three times the current which can normally be supplied by a typical motor vehicle 12 volt battery. Motor vehicle alternators are typically specified to provide either all or most of the power requirement for the entire vehicle, the battery only being used to store sufficient electrical power to start the vehicle engine and occasionally deliver power when the accessory load exceeds the alternator output. Typical European vehicle alternators are specified to provide about 130 A of current, while an electrically powered supercharger can require in excess of 300 A. An alternator able to supply this much current is significantly more expensive, heavy and bulky than a conventional alternator.

Because the pressure boosting device cannot be 100% efficient, there will also be inevitable electrical and mechanical losses associated with the device, that can place significant mechanical and thermal stress on components within the device.

The expense of increasing the capacity of the vehicle battery and charging system, or the dealing with inherent thermal and mechanical limits of components within the pressure boosting device, to meet any level of driver demand can easily outweigh the benefits of using an electrically driven pressure charging device. Therefore it is important to drive such a device in an efficient manner, and within the limits of the vehicle electrical power supply, and thermal and mechanical limits of the device itself. At the same time, it is important to maximise the torque boost benefit perceived by the driver over as wide a range of driving conditions as possible. Because the level at which an electrically driven pressure boosting device is driven is essentially independent from the engine operating speed, it is therefore necessary to devise an appropriate control system for operating the pressure boosting device that takes account of the system's limitations.

SUMMARY OF THE INVENTION

It is an object of the present invention to provide a convenient and economical electrical pressure boosting device and method for increasing the torque available from an internal combustion engine.

According to the invention, there is provided an air charge boosting system for an internal combustion engine, the system comprising an electrically driven pressure charging device, an electrical supply system for providing electrical power to drive the pressure charging device including a battery and an engine-driven battery recharger, and an electronic control system for controlling the operation of the pressure charging device and the electrical supply system, wherein the electronic control system is arranged to:

a) determine one or more allowable operating limits to the operation of the pressure charging device based on the state of the electrical supply system; and b) drive the pressure charging device using the engine-driven battery recharger when the state of the electrical supply system is within an acceptable range; and c) isolate at least partially the battery from the engine-driven battery recharger and drive the pressure charging device using the battery when the state of the electrical supply system is not within an acceptable range.

Also according to the invention, there is provided a method of operating an air charge boosting system for an internal combustion engine, the system comprising an electrically driven pressure charging device, an electrical supply system for providing electrical power to drive the pressure charging device including a battery and an engine-driven battery recharger, and an electronic control system for controlling the operation of the pressure charging device and the electrical supply system, wherein the method comprises the steps of using the electronic control system to:

i) calculate one or more allowable operating limits to the operation of the pressure charging device based on the state of the electrical supply system; and ii) drive the pressure charging device using the engine-driven battery recharger when the state of the electrical supply system is within an acceptable range; and iii) isolate at least partially the battery from the engine-driven battery recharger and drive the pressure charging device using the battery when the state of the electrical supply system is not within an acceptable range.

Because the pressure charging device is operated from the battery when the state of the electrical supply system is not within an acceptable range, other electrical components may be operated from the battery recharger. This helps to avoid problems due to operation of the device beyond the allowable limits such as a drop in voltage available to drive other electrical components, thereby allowing more economical system design. This will in general also result in reduced electrical power consumption for the device. Both of these benefits contribute towards reducing system mass, volume and cost, and improving the electrical efficiency of the device.

The state of the electrical supply system may be a battery state of charge. Preferably, the acceptable range for the battery state-of-charge is a predetermined minimum supply voltage for the battery.

Additionally or alternatively, the state of the electrical supply system may be the level of the electrical load on the battery recharger, particularly a maximum acceptable electrical load.

In a preferred embodiment of the invention, one or more additional non-electrical allowable operating limits to the operation of the pressure charging device are also determined. The operation of the pressure charging device is then limited according to the determined allowable operating limit that places the greatest restriction on the operation of the electrically driven pressure charging device. Therefore, the operation of the pressure charging device remains within all allowable operating limits.

The additional operating parameter may be a thermal parameter of the pressure charging device, in which case the determined allowable operating limit may be a maximum thermal limit.

It is particularly advantageous if the calculation of the allowable operating limit involves a calculation of both a soft operational limit and a hard operational limit. The operation of the electrically driven charge boosting device then being limited when the corresponding operating parameter exceeds the soft operational limit. The limitation is then such that the operating parameter does not at a later time exceed the hard operational limit. Such limitation may takes several forms, but so that operation of the pressure boosting device is not suddenly or unexpectedly limited, it is preferred if the driven boosting device is progressively limited as the corresponding operating parameter approaches the hard operational limit.

For example, on a hot summer day with a hot engine, the thermal limits may be reached well before the battery state-of-charge starts to limit the amount of current that may be provided by the battery, while on a cold winter night, the reverse may be the case.

The air boosting system may comprise an electronically controlled throttle for controlling engine aspiration. The system may then: set the throttle position to regulate the aspiration of the engine; determine the actual air charge according to engine operating conditions; compare the desired air charge with the actual air charge; and drive the pressure charging device to boost aspiration of the engine in accordance with the comparison between the desired air charge and the actual air charge only when the throttle is wide open and when the torque demand cannot be met by natural aspiration alone.

The engine torque output at any given engine speed is then controlled by the throttle at throttle positions below wide open throttle. Once the throttle position reaches wide open throttle, the control system operates the pressure charging device according to the comparison between the desired air charge and actual air charge, for example in such a way as to reduce a difference between these air charges to zero in the case of steady state operation of the pressure charging device.

The pressure charging device operation is therefore limited to regions where engine torque demand cannot be met with natural aspiration alone. Furthermore, the efficiency of assisted aspiration is increased by avoiding restriction by a partly open the throttle, and by matching the actual air charge to the desired air charge by the electrical control of the pressure charging device.

The desired air charge may be calculated according to current engine operating conditions, including a current air charge. The current air charge may be measured directly, for example by means of an air flow sensor, or indirectly, for example by engine inlet air pressure sensor and an engine speed sensor.

The overall efficiency of assisted aspiration is also increased by matching the actual air charge to the desired air charge by the electrical control of the pressure charging device.

The electronic control system preferably provides closed-loop control over the operation of the electrically driven pressure charging device by monitoring the current air charge. Other engine operating parameters may also be measured, for example engine speed, engine temperature. It may also be useful to measure ambient conditions such as ambient temperature and relative humidity. Any such parameters which may have an effect on the calculation of the desired air charge may be included in this calculation.

The engine torque demand may be calculated according to a driver demand, for example the output from an electronic accelerator pedal sensor. The engine torque demand may be modified according to other inputs, for example an input from a traction control system, a clutch pedal sensor, a collision warning system, or a system for controlling the operation of an automatic gearbox.

Preferably, the desired air charge is a measure of desired air pressure and/or desired mass air flow.

The pressure charging device may be any type of device for boosting the air mass flow into the engine, whether partially or wholly driven by an electric power supply, but is most preferably an electrically driven supercharger with a number of rotary impeller vanes. The geometry of the each vane is fixed, and the actual air charge delivered through the supercharger is determined by the rotation speed of the impeller vanes.

BRIEF DESCRIPTION OF THE DRAWINGS

The invention will now be described in further detail, and by way of example only, with reference to the accompanying drawings, in which.

DETAILED DESCRIPTION

Figure 1:
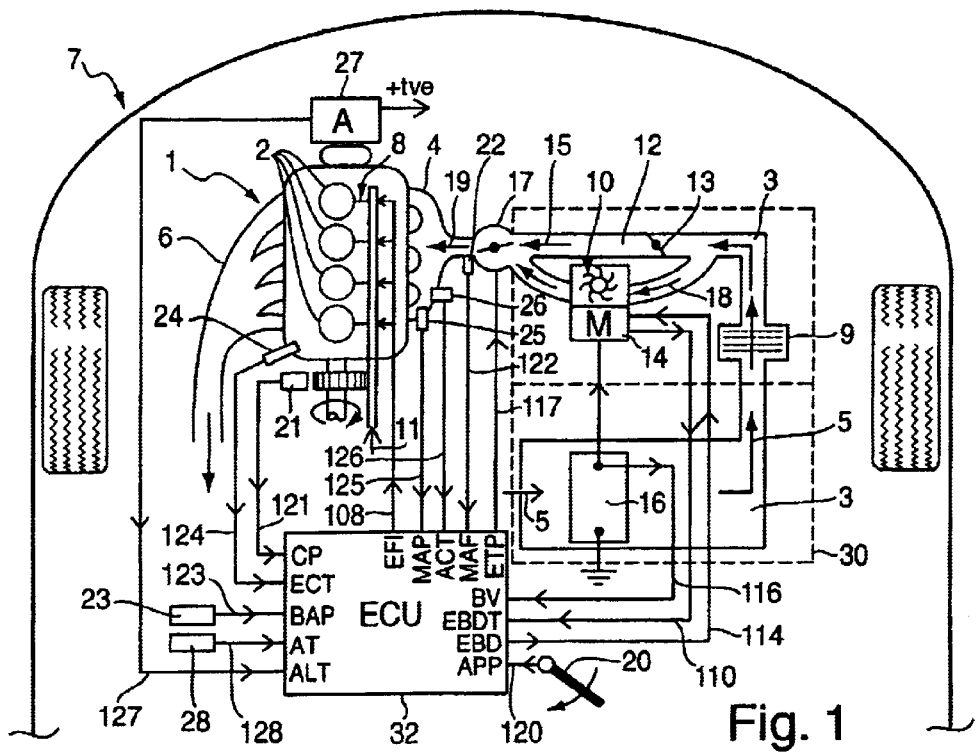
FIG. 1 is a schematic diagram of a motor vehicle having a 1.4 litre, four cylinder engine system with air charge boosting system, according to the invention.

FIG. 1 shows schematically part of a motor vehicle 7 having a reciprocating piston internal combustion engine 1, with four in-line cylinders 2, an air inlet manifold 4 and an exhaust manifold 6 leading respectively to and from each of the cylinders 2. A fuel injection system 8 supplies fuel 11 to cylinders 2 in a manner well-known in the art. A pressure charging device or electronic boost device (EBD) 10, here an electrically driven supercharger 10, is provided upstream of the inlet manifold 4.

Air flows to the inlet manifold 4 through the supercharger 10 when this is operational, or when the supercharger is disabled or idling, through an air bypass conduit 12 in parallel with the EBD 10. Air is supplied to the EBD 10 and/or the bypass 12 along an inlet air path 3.

The air bypass conduit 12 has an air valve 13 that automatically opens to permit inlet air 5 to bypass 15 the EBD 10 when airflow 18 through the supercharger is insufficient to charge the engine cylinders 2 with air. Air supply 19 to the engine 1 is then controlled by the setting of an electronically controlled throttle valve 17 downstream of the EBD 10 and bypass 12, and the activation of the EBD 10. When the EBD 10 is not activated, the engine 1 is normally aspirated, and when the EBD 10 is activated, the airflow to the engine is increased.

The EBD 10 is driven only by a switched reluctance electrical motor (M) 14 powered by a 12-volt lead/acid vehicle battery 16. The battery is recharged by an engine-driven battery recharger, here a belt-driven alternator 27. The battery 16 has a current rating which is about 30 A higher than would normally be specified for a mass-market four cylinder engine motor car. In addition to powering the EBD 10, the battery 16 also provides for the vehicle starting, lighting and ignition requirements. The battery 16 also lies within the air supply path 3, within a hollow enclosure 30 that surrounds the battery 16 and EBD 10, so that inlet air 5 flows around the battery 16. An air filter 9 is provided in the air supply path 3 downstream of the battery 16 and upstream of the EBD 10 and air bypass 12.

The vehicle driver (not shown) can control the engine power via a movable accelerator pedal assembly 20, that provides an electrical signal 120 to an engine control unit (ECU) 32 indicative of accelerator peddle position (APP).

The engine control unit monitors several engine operating parameters via nine input lines 116, 120–127. One line 116 is connected to the battery supply so that an A/D converter (not shown) within the ECU 32 can measure the battery 16 voltage. Another input line 127 comes from the alternator, which has its own internal electronics and processor (not shown) that monitor the temperature of the alternator, and also capacity ultilization of the alternator, depending on the alternator temperature, alternator rotational speed and current drawn from the alternator. The alternator capacity utilization is communicated from the alternator to the ECU 32 along the line 127.

Seven other input lines 120–126 are each connected to a corresponding sensor device 20–26 for measuring engine operating conditions. The sensors include: the accelerator pedal assembly (APP) 20 for measuring driver demand; a crank position (CP) sensor 21 for measuring engine speed; a mass air flow sensor (MAF) 22 downstream of the throttle 17 for measuring directly the amount of air entering the cylinders 2; a barometric air pressure (BAP) sensor 23 for measuring atmospheric pressure; an engine coolant temperature (ECT) sensor 24 for measuring the temperature of coolant circulating with the engine; a manifold air pressure (MAP) sensor 25 for measuring the pressure of air in the inlet manifold 4; and an inlet air charge temperature (ACT) sensor 26 for measuring the temperature of the inlet air.

Additionally, an ambient temperature (AT) sensor 28 measures the ambient air temperature and provides an input on line 128 to the electronic control unit 32.

Optionally, control electronics in the motor 14 provides a temperature signal (EBDT) 110 to the engine control unit 32. Alternatively, the engine control unit may calculate temperature parameters for the EBD 10 based on the ambient temperature signal 128 from the ambient temperature sensor 28, and the speed and duty cycle of the EBD 10.

As will be explained in more detail below, the engine control unit 32 calculates an engine torque demand from the various input signals, and provides a number of output signals to control various vehicle and engine operating parameters, including a fuel injection control signal 108, throttle valve control signal 117 and a supercharger motor control signal 114. The engine torque demand is therefore set at least in part by the position of the accelerator pedal 20.

As will be explained in more detail below, when the driver moves the accelerator pedal 20 to demand engine torque in excess of that which can be delivered by the engine 1 when naturally aspirated, the throttle valve 17 moves to a maximum setting to admit the maximum volume of air 19 into the cylinders 2. The engine control unit 32 then activates the supercharger motor 14 under certain moderate or low engine speeds, but not at high engine speeds. As long as the torque demand exceeds that available from natural aspiration of the engine alone, the boosted engine torque output is controlled by the supercharger speed and the amount of fuel supplied to the cylinders. As soon as torque demand falls within that available from natural aspiration, the electrically driven EBD 10 is no longer driven by the supercharger motor 14. This helps to conserve battery lifetime, and reduce heating of the EBD 10, thereby preserving battery capacity and extending the lifetime of the EBD 10. If the engine is an injection engine, the engine control unit 32 can control the amount of injected fuel 11 by electrical control 108 of the injectors 8.

When supercharger operation is required, the engine control unit 32 sets both the speed of the EBD 10 and delivered fuel amount according to the current torque demand. The engine control unit 32 monitors the output 120–126 from the various sensors 20–26, as well as the battery voltage 116, and then adjusts the supercharger speed and/or the amount of delivered fuel 11 to achieve an appropriate level of rich or lean engine operation.

Figure 2:
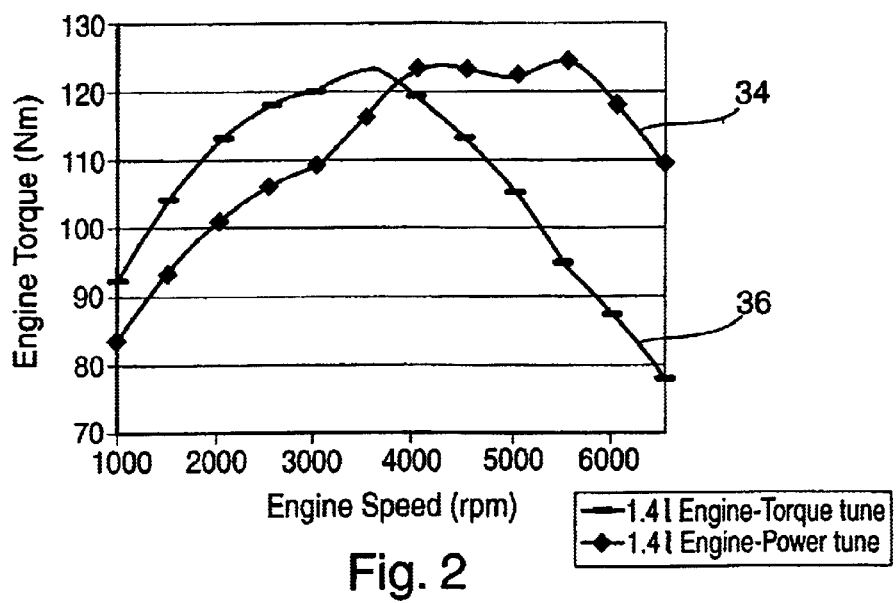
FIG. 2 is a graph plotting engine torque against engine speed for the 1.4 litre engine of FIG. 1 when naturally aspirated, tuned either for maximum torque at a low moderate engine speed, or maximum engine torque at a higher moderate engine speed.

FIG. 2 shows a graph of engine torque against engine speed for a conventional four-cylinder in-line engine, such as that described above, but without supercharging. As can be seen from curve 34 of FIG. 2, the engine can be tuned to provide good power at moderately high engine speeds ("power tune"), but at the expense of low-end torque.

Alternatively, as shown by curve 36, the engine can be tuned to give good torque at low and moderate engine speeds ("torque tune"), but at the expense of top-end power. Whilst "power tune" will appeal to the 'sporting' driver, it will result in lower levels of satisfaction for the majority of car owners. The requirement to deliver good real world 'performance feel' commonly results in an engine torque output as shown in the "torque tune" curve, where torque at high engine speeds has been compromised in order to promote torque output below 3500 rpm. Although engine gearing can be selected to minimize undesirable characteristics, in practice conventional engines are tuned to achieve a compromise.

Figure 3:
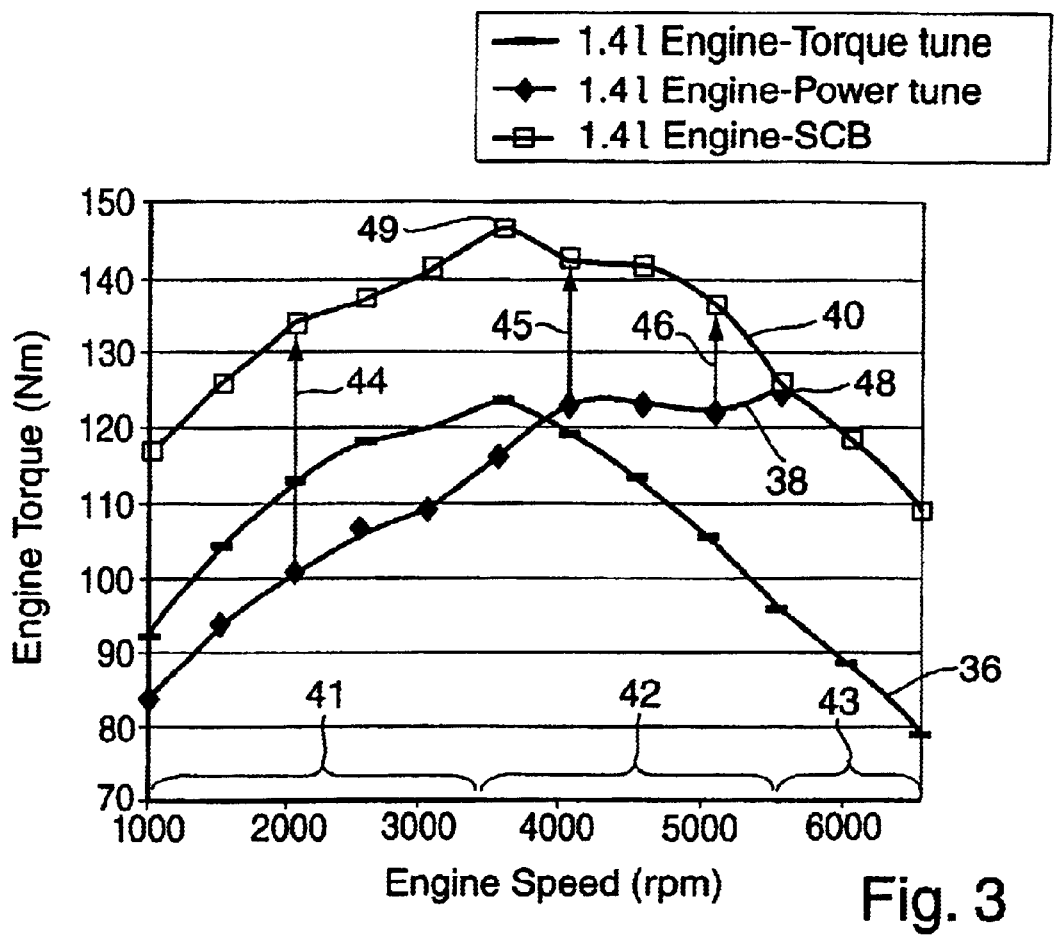
FIG. 3 is a graph similar to that of FIG. 2, showing also the effect on engine torque output with the engine of FIG. 1 when using the air charge boosting system.

With reference to FIG. 3, in the preferred embodiment of the invention, a relatively low capacity engine, for example below about 1.8 litres capacity, is tuned to give good torque at high rpm 43, at the expense of torque at low engine speed 41 and moderate engine speed 42, as illustrated by curve 38. This has the secondary effect of allowing good fuel economy at steady highway cruising speeds through the need to use wider throttle openings to achieve cruising speed. As can be seen from curve 40 for supercharger boost (SCB), there is then an increase 44,45,46 in maximum available engine torque when the driver demands power in excess of that available from a naturally aspirated engine. The boost is made available under control of the engine control unit 32 only in a region of low 41 and moderate 42 engine speeds, and is progressively limited to transition smoothly into engine power near or at a peak 48 in the un-boosted torque curve 38 in a region of relatively high engine speed 43. This is done by progressively limiting the maximum allowable supercharger boost near point 48.

Thus, the engine control unit 32 enables use of the EBD 10 only in such a way that the engine torque output with the supercharger boost peaks 49 in the region of moderate engine speed 42.

Figure 4:
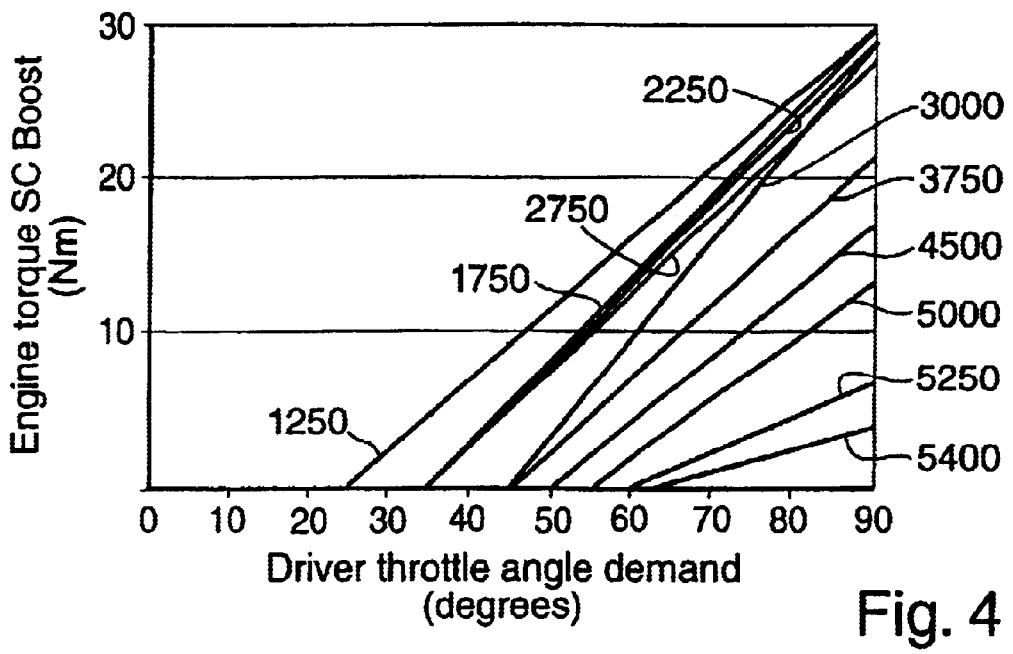
FIG. 4 is a graph plotting engine compressor torque boost against driver throttle engine demand for the engine of FIG. 1, showing the torque boost effect of the air charge boosting system at different engine speeds.

FIG. 4 shows a graph of engine torque supercharger boost against driver throttle angle demand between 0° and 90°. The diagonal straight lines on the graph are labelled with engine speed in rpm, between 1250 rpm and 5400 rpm. The vertical scale corresponds to the difference in engine torque in FIG. 3 between the boosted torque curve 40 and the un-boosted torque curve 38. At the maximum throttle angle 90°, the engine torque supercharger boost is the maximum value shown in FIG. 3. As throttle angle demands declines from 90°, so does the engine torque supercharger boost, until this declines to zero boost corresponding to curve 38 of FIG. 3.

As can be seen from FIG. 4, as the engine speed increases towards the transition point 48 of FIG. 3, the slope of the engine torque supercharger boost curve declines, until at the transition point 48, there is no engine torque supercharger boost. This shows graphically the progressive disabling of the supercharger boost.

The invention will now be described with reference to FIG. 5, which shows a schematic overview of an electronic control system 50 for controlling the operation of the EBD 10, and also to FIG. 6, which shows a diagram of the control system architecture 60 of the air charge boosting system.

Figure 5:
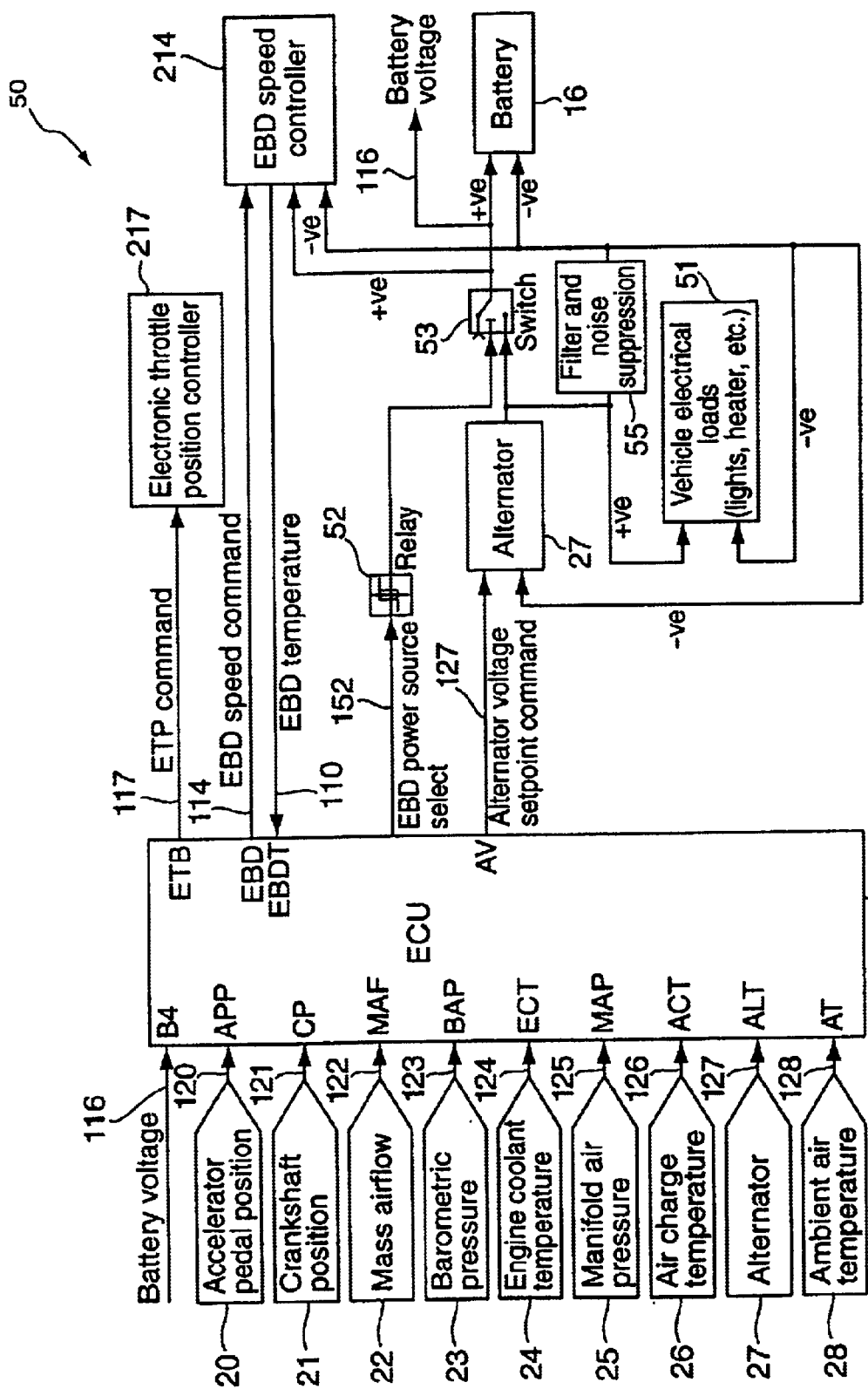
FIG. 5 is a schematic overview of the electronic control system for controlling the operation of the pressure charging device.

FIG. 5 shows how the engine control unit (ECU) 32 receives the various inputs 116,120–128 described above, in order to generate various outputs to control the operation of the system. One output is an electronic throttle position (ETP) command 117, sent to an electronic throttle position controller 217 that controls the throttle 17. The ETP controller 217 then sets the position of the throttle 17 accordingly.

The ECU 32 also sends an electronic boost device (EBD) command 114 to an EBD controller 214 that controls the motor 14. When the EBD 10 is not required, the motor 14 is controlled to idle at a relatively low regulated speed of about 10,000 rpm, which consumes relatively little electric power and which also produces no significant boost pressure. By idling the EBD 10 at 10,000 rpm, it is possible to reduce the spin up time to the rated operating speed of about 60,000 rpm to less than 0.3 s.

The EBD 10 may not be capable of indefinite operation at its maximum output owing to limitations of the battery 16 storage and alternator 27 charging current, and so the battery state-of-charge (SOC) may restrict operation. Additionally some components of the EBD 10 such as bearings or motor windings (not shown) may exceed design temperature limits at high operation duty factors. It may therefore also be necessary to constrain the operation of the EBD 10 owing to these considerations.

Although the electrical power supply to the EBD 10 may be from the usual vehicle electrical system, it is preferred if the EBD 10, during operation above idle speeds, is isolated at least partially from the battery charging system, including the alternator 27, and run mainly or entirely from the battery 16.

Therefore, the ECU 32 calculates allowable operating limits to the operation of the EBD 10 based on the state of the electrical supply system. When the state of the electrical supply system is within an acceptable range, the EBD 10 is driven using the engine-driven battery charging system and alternator 27, and when the state of the electrical supply system is not within an acceptable range, the battery 16 is isolated from the battery charging system and the alternator 27 and the EBD 10 is driven using the battery alone.

In the preferred embodiment of the invention, the ECU 32 determines the state of the electrical supply system both by monitoring the battery voltage, and by monitoring the capacity utilization of the alternator. If the electrical load on the alternator becomes large enough to saturate the alternator, then electrical supply system voltage will drop, and this can cause a noticeable loss of functionality in other electrical units powered by the vehicle electrical system.

To prevent this happening, once the alternator reaches saturation point, the EBD 10 during operation above idle speeds is isolated from the battery charging system 27 and run from the battery 16 alone. The alternator is then able to power other vehicle consumer units (CU) 51, such as lights and electrical accessories, which are therefore isolated from voltage drops that may occur at the battery 16 owing to the large electrical current required by the EBD 10, typically between about 150 A and 300 A. This switching is achieved by means of a an EBD power source select command 152 sent from the ECU 32 to a relay 52 and switch 53.

The ECU 32 therefore drives the EBD 10 using the alternator 27 when the battery state-of-charge is within an acceptable range, and isolates the battery from the alternator and drives the EBD 10 using the battery alone when the battery state-of-charge is not within an acceptable range.

The regulated voltage set point of the alternator 27 is then controlled by an alternator voltage setpoint command 127 sent from the ECU 32 to the alternator 27.

Figure 6:
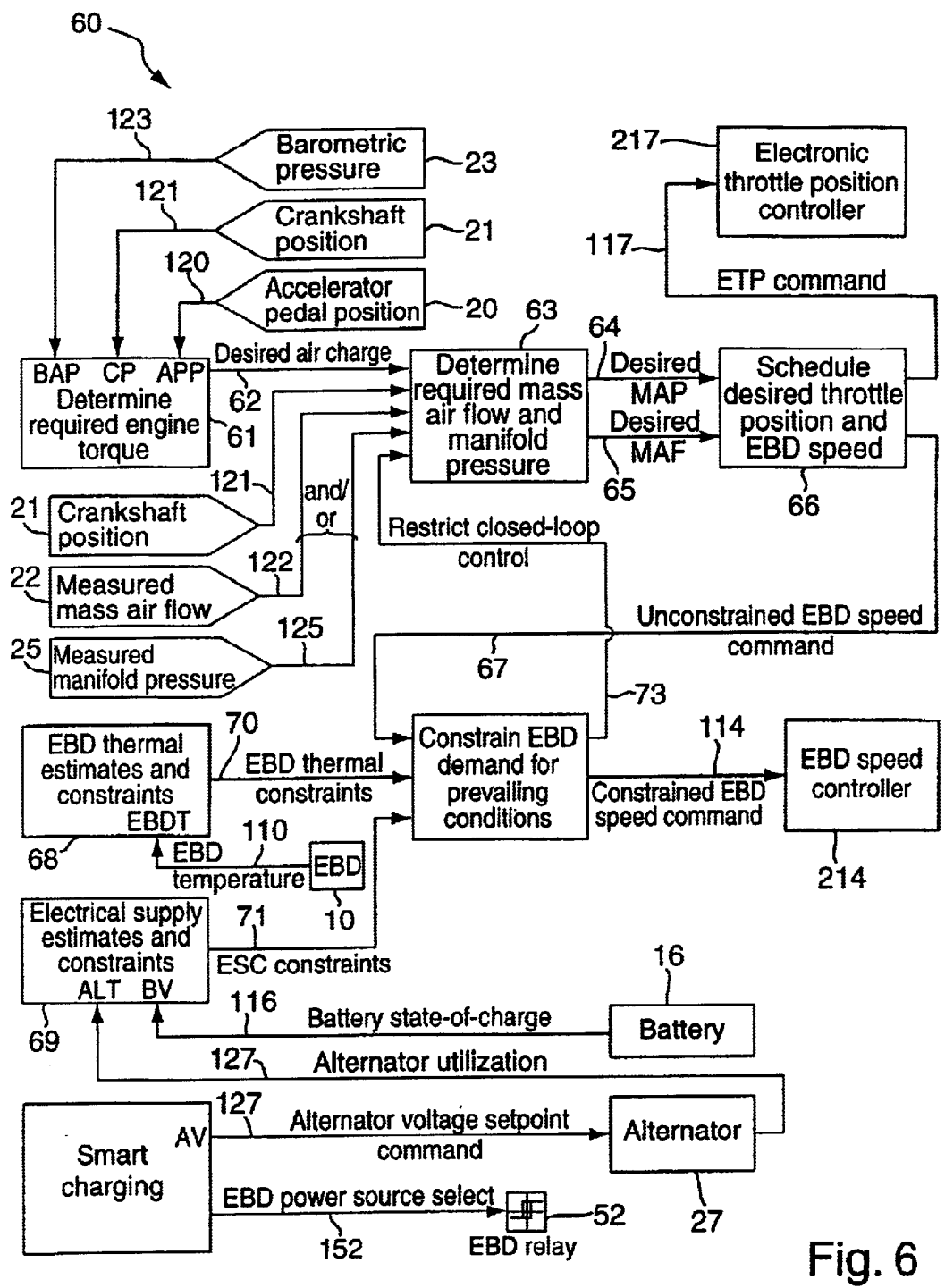
FIG. 6 is a diagram of the control system architecture of the air charge boosting system.

Referring now in particular to FIG. 6, the ECU 32 uses the input 120–123 from the accelerator pedal position sensor 20, crankshaft position sensor 21 and barometric pressure sensor 23 to determine the required engine torque 61. The calculation 61 will also take account of other relevant factors, such as engine friction, accessory losses and, for a spark ignition engine, the prevailing spark advance angle. From this, it is possible to calculate a desired air charge 62, that is, the amount of air, required for each cylinder ignition event.

The desired air charge 62, is then used by the ECU 32 together with other inputs, in particular the engine speed as measured from the crankshaft position 121, and the measured mass air flow 122 and/or the measured manifold pressure 125 in a calculation 63 to determine the required manifold air pressure 64 and the required mass air flow 65. A determination is made within calculation 63 as to whether or not EBD 10 operation is required, based on whether or not the desired manifold air pressure 64 is greater than the barometric pressure, and if so, a hysteresis term is applied to avoid rapid cycling of the EBD 10.

The ECU 32 is then able to schedule the desired throttle position and the EBD speed 66, from which the ECU generates the ETP command 117 for the electronic throttle position controller 217, and an unconstrained EBD speed command 67.

As mentioned above, the unconstrained EBD speed command 67 will in some circumstances need to be constrained, for example because of over-heating of the EBD 10, the maximum rated speed or duty cycle of the device, owing to strength and lubrication considerations, or because of the battery state-of-charge (SOC) constraints. Constraints may also have to applied to avoid regions in which the EBD 10 would surge. In FIG. 6, calculations 68,69 by the ECU 32 of two such possible constraints are shown, namely thermal estimates and constraints 70 and electrical supply estimates and constraints (battery state-of-charge constraints) 71.

The ECU then calculates 72 a constrained EBD speed command 114 according to the prevailing operating conditions, and sends this to the EBD controller 214 associated with the motor 14.

The calculation 63 is, however part of a closed loop control of the engine air charge. The actual measured MAF 122 or MAP 125 is compared to the desired value and an adjustment made to generate the desired MAP 64 and the desired MAF 65 in order to realise accurately the desired setting. In the event that the EBD is restricted or operation of the system constrained in some way, then the operation of the closed loop control is restricted 73 in order to prevent controller wind-up.

As described above, for all operating conditions that may be achieved without the operation of the EDB 10, that is, when inlet manifold air pressure (MAP) 25 is less than barometric air pressure (BAP) 23, the engine torque output will be regulated by the throttle 17 alone. If the EBD 10 is not required then the EBD 10 is scheduled to operate at an idle speed where no boost is produced. In the event that the EBD 10 is required then the throttle is scheduled to be fully open and the EBD speed is scheduled based on the barometric pressure, the desired manifold air pressure, and the desired mass air flow according to a boost map of EBD characteristics held within ECU memory (not shown). Preferably, derating factors for the EBD thermal and SOC constraints 70, 71 are applied as required to generate the final constrained EBD speed command 114. In the event that the system is constrained for both thermal limits and SOC considerations, then the largest derating factor is applied.

The calculation of the derating factors should be chosen so as to minimise driver perception of the derating, and also make the derated performance predicable for the driver, by avoiding sudden changes. The thermal derating calculation 68 involves two parts, namely regulation and estimation. The estimation part of the calculation is based on the operating conditions of the EBD 10. Both the present and future steady state temperatures of critical parts of the EBD 10 are estimated. Critical parts typically include the bearings supporting an EBD shaft and copper windings of the EBD motor. When the system is initialised, the temperatures of these parts are estimated based on the temperatures when the system was turned off, the time it has been off, and the prevailing ambient temperature, for example from the ambient temperature sensor 28. The dynamic temperature estimate accounts for variations in the air flowing past the EBD 10, the thermal inertia of the component parts, and the heat generated in the system from both electrical and mechanical sources.

The regulation part involves predicting for which of the components in the system the design temperatures could be exceeded, based on estimated or measured temperatures. For these, the EBD operation may be restricted in order to remain within design guidelines. This is achieved by the calibration of 'soft' and 'hard' limits for each of these components. When the temperature is below the soft limit no action is taken. When the temperature exceeds the soft limit and the temperature at the desired EBD operation level will result in the hard limit being exceeded in a steady state operation, then some action must be taken to avoid exceeding the hard limit. The EBD 10 is progressively derated using a control loop with an output of predetermined percentage degrade factor, as shown by feed back loop 73, until the predicted steady state temperature is equal to the hard limit, at which point the EBD duty may be sustained. When more than one component of the system may exceed design values, a derating factor is calculated for each and the minimum one selected for use.

The battery state-of-charge calculation 69 is performed in an analogous manner to the EBD thermal calculation 68 described above. An estimation part of the calculation involves a computer model of the storage capacity of the battery 16. This is used together with the history of the charging and discharging to make an estimate of the current stored charge compared to the maximum available at the prevailing ambient conditions. Additionally the rate of discharge is estimated.

The regulation is then performed as follows. When the power consumption of the EBD 10 would saturate the alternator 27 power output, resulting in a fall in the vehicle system voltage as the battery 16 was used to supplement the alternator, unacceptable effects such as dimming of lights, etc. might be experienced. To prevent this, the relay 52 is engaged to switch 53 powering of the EBD 10 to the battery alone, whilst the remaining vehicle system is powered from the alternator 27.

A 'soft' limit is calibrated for the system state-of-charge (SOC) above which no action need be taken to protect battery charge. A 'hard' limit is also calibrated below which SOC the battery should not be allowed to fall. When SOC falls below the soft limit the system must start to take action so as to achieve a 'soft landing' at the hard limit of SOC without sharp falls in engine output due to reduction in power to the EBD 10. The derate factor for the EBD 10 in the feedback loop 73 is increased until the power drawn by the EBD 10 is equal to the excess generation capacity of the alternator 27, at which point the relay 52 may be switched so that the alternator 27 now powers the EBD 10 as well as the remaining vehicle electrical system. The EBD 10 power is then held at or below a level that does not cause the alternator 27 to fully saturate.

Figure 7:
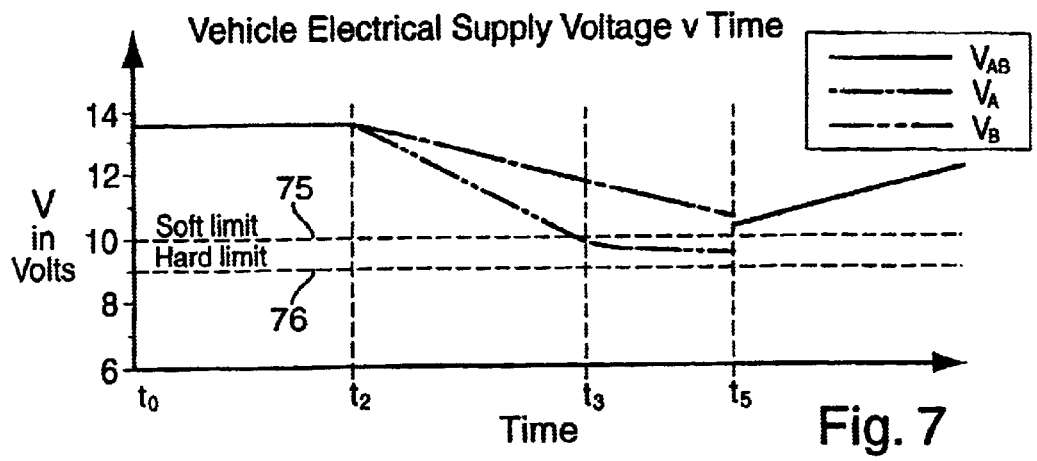
FIGS. 7, 8 and 9 are plots that show schematically how the vehicle electricity supply responds to current drawn by the supercharger and other vehicle consumer units.
Figure 8:
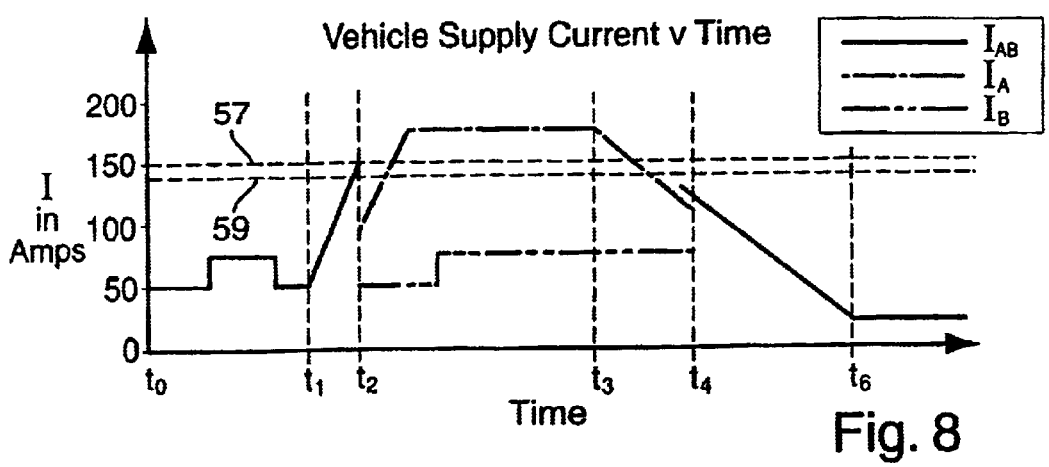
Figure 9:
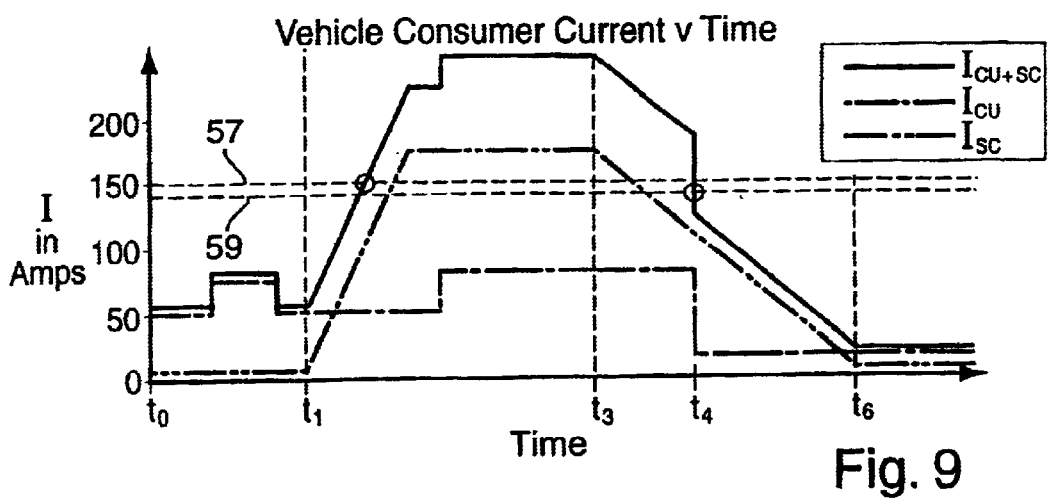

The management of the vehicle electrical supply is illustrated in the schematic graphs of FIGS. 7, 8 and 9. FIG. 7 plots the voltage of the vehicle electrical supply against time, FIG. 8 plots the vehicle supply current against time, and FIG. 9 plots the current drawn by vehicle electrical consumers against time.

In the example shown in these figures, initially at time to the alternator 27 is connected to the battery 16, and the vehicle supply voltage $V_{AB}$ is a nominal 13.6 volts. Vehicle electrical consumer units (CU) such as lights, electrically heated windows, etc, initially draw a moderate amount of current $I_{CU}$, 50 A, rising temporarily to 75 A. Initially, the EBD 10, in this instance a supercharger (SC), is set to idle at about 10,000 rpm, drawing just a few amps of current $I_{SC}$.

Because the total drawn current $I_{CU+SC}$ is below the electrical capacity 57 of the alternator 27 of 150 A, the alternator 27 is electrically connected to the battery 16 through the relay 52 and switch 53.

At time $t_1$ the driver demand requires operation of the EBD 10, after which the supercharger current $I_{SC}$ rises rapidly towards about 175 A. When the total current $I_{CU+SC}$ reaches a threshold value 57 of 150 A at time $t_2$, the relay 52 causes the switch 53 to open, and the alternator 27 becomes partially isolated from the battery 16. A filter 55 is provided between the battery 16 and alternator 27 in order to provide a degree of smoothing on the alternator voltage, which could otherwise fluctuate owing to the relatively slow response of the alternator to sudden changes in electrical load. In its simplest form, the filter 55 is a 0.1Ω resistor, although the filter could also include frequency dependent elements, such as a high pass filter.

The supercharger EBD 10 is now free to draw very high currents $I_{SC}$ from the battery 16 that may cause the battery voltage $V_B$ to fall significantly. Because the filter 55 limits the flow of current between the alternator 27 and the battery 16, the alternator is not exposed to the full load of the EBD 10, and is able to continue providing regulated power to the remainder of the vehicle systems.

During the operation of the large electrical accessory, the battery 16 will become increasingly discharged, as shown by the drop in battery voltage $V_B$. At time $t_3$ battery voltage $V_B$ reaches a soft threshold level 75 at 10 volts, the ECU 32 takes action to reduce the supercharger current $I_{SC}$, so that the battery voltage remains above a hard limit 76 of 9 volts.

At time $t_4$ the total vehicle current $I_{CU+SC}$ has dropped to the threshold value 57 of 150 A, and so the ECU 32 acts to close the switch 53, after which the total vehicle current is provided by the connected alternator 27 and battery 16. Optionally, a second threshold value 59 of 145 A may be used when the current is falling to provide hysteresis. At time $t_6$, the supercharger current $I_{SC}$ has dropped to an idle level, for example, owing to high engine speed 43 having been reached.

As shown in FIG. 7, following time $t_2$, as the battery voltage $V_B$ is being depleted, the ECU 32 gradually lowers the alternator voltage $V_A$ to just below 11 volts. This causes power in electrical consumers to drop, but because the drop is slow, this is not noticeable to the vehicle driver. At time t5, when the alternator and battery are reconnected, the combined voltage $V_{AB}$ is about 10.5 volts, but then rises steadily as the alternator 27 recharges the battery 16.

If no action were taken to reduce the alternator voltage $V_A$ between times $t_2$ and $t_5$, then there would be a sudden and noticeable drop in system voltage at time $t_5$ when the alternator 27 and battery 16 are reconnected. By gradually reducing the alternator voltage $V_A$ while the supercharger 10 is active, this problem is reduced or eliminated.

Therefore, when the relay switch 53 is closed, the system voltage is sufficiently low to ensure that the alternator 27 is not saturated and no sudden change in electrical system voltage occurs. The system voltage $V_{AB}$ is then gradually increased again back to the desired voltage at a rate determined by the charging of the battery 16 so as to ensure that the alternator 27 is never saturated and is always able to provide voltage regulation.

The invention described above is applicable to both spark ignition and compression engines. The EBD 10 may be the only inlet air compressor device in the system, or it may be combined with another such device, for example an exhaust gas driven turbocharger device.

The invention therefore provides a convenient and economical electrical pressure boosting device and method for increasing the torque available from an internal combustion engine. The electrically driven pressure boosting device is provided as part of the engine's air intake system, and is fully electronically controllable. Use of such a compressor device increases the engine's maximum torque output over portions of its operating range that are significant to the performance perceived by the driver. The invention is compact, and avoids the need to increase excessively the capacity of the vehicle electrical system, or the thermal and mechanical rating of the device, thus allowing benefits in terms of both vehicle performance and overall fuel economy, at a reasonable system cost.

It is to be recognized that various alterations, modifications, and/or additions may be introduced into the constructions and arrangements of parts described above without departing from the spirit or scope of the present invention, as defined by the appended claims.

What is claimed is:

1. An air charge boosting system for an internal combustion engine, the system comprising an electrically driven pressure charging device, an electrical supply system for providing electrical power to drive the pressure charging device including a battery and an engine-driven battery recharger, and an electronic control system for controlling the operation of the pressure charging device and the electrical supply system, wherein the electronic control system is arranged to:

a) determine one or more allowable operating limits to the operation of the pressure charging device based on the state of the electrical supply system; and b) drive the pressure charging device using the engine-driven battery recharger when the state of the electrical supply system is within an acceptable range; and c) isolate at least partially the battery from the engine-driven battery recharger and drive the pressure charging device using the battery when the state of the electrical supply system is not within an acceptable range.

2. A method of operating an air charge boosting system for an internal combustion engine, the system comprising an electrically driven pressure charging device, an electrical supply system for providing electrical power to drive the pressure charging device including a battery and an engine-driven battery recharger, and an electronic control system for controlling the operation of the pressure charging device and the electrical supply system, wherein the method comprises the steps of using the electronic control system to:

i) calculate one or more allowable operating limits to the operation of the pressure charging device based on the state of the electrical supply system; and ii) drive the pressure charging device using the engine-driven battery recharger when the state of the electrical supply system is within an acceptable range; and iii) isolate at least partially the battery from the engine-driven battery recharger and drive the pressure charging device using the battery when the state of the electrical supply system is not within an acceptable range.

3. The method according to claim 2, in which one or more additional non-electrical allowable operating limits to the operation of the pressure charging device are calculated, and the operation of the pressure charging device is limited according to the calculated allowable operating limit that places the greatest restriction on the operation of the electrically driven pressure charging device so that the operation of the pressure charging device remains within all allowable operating limits.

4. The method according to claim 2, in which the engine torque demand is calculated according to a driver demand.

5. The method according to claim 2, in which said state of the electrical supply system is a battery state-of-charge.

6. The method according to claim 5, in which said state of the electrical supply system is a predetermined minimum supply voltage for said battery.

7. The method according to claim 2, in which said state of the electrical supply system is an electrical load on the battery recharger.

8. The method according to claim 7, in which the load is a maximum acceptable load on the battery recharger.

9. The method according to claim 2, in which the calculation of the allowable operating limit involves both a soft operational limit and a hard operational limit, the operation of the electrically driven pressure charging device being limited when the operation of the pressure charging device would exceed the soft operational limit, the limitation being such that the operation of the pressure charging device does not at a later time exceed the hard operational limit.

10. The method according to claim 9, in which the operation of the electrically driven pressure charging device is progressively limited as the operation of the pressure charging device approaches the hard operational limit.

11. The method according to claim 2, in which the air charge boosting system comprises an electronically controlled throttle for controlling engine aspiration, wherein the method comprises the steps of using the electronic control system to: set the throttle position to regulate the aspiration of the engine; determine the actual air charge according to engine operating conditions; compare the desired air charge with the actual air charge; wherein the pressure charging device is driven to boost aspiration of the engine in accordance with the comparison between the desired air charge and the actual air charge only when the throttle is wide open and when the torque demand cannot be met by natural aspiration alone.

12. The method according to claim 11, in which the desired air charge is calculated according to current engine operating conditions, including a current air charge.

13. The method according to claim 11, in which the electronic control system provides closed-loop control over the operation of the electrically driven pressure charging device by monitoring the current air charge.

* * * * *